Patented June 19, 1945

2,378,716

UNITED STATES PATENT OFFICE 2,378,716

METHOD FOR KILLING PLANTS

George E. Lynn and Bernard J. Thiegs, Midland, Mich., assignors to The Dow Chemical Company, Midland, Mich., a corporation of Michigan No Drawing. Application March 2, 1944, Serial No. 524,808

3 Claims. (Cl. 167—45)

This invention relates to a method for killing plants, and is particularly concerned with the control of weeds and other undesirable vegetation by the application of phytocidal agents thereto.

Many organic and inorganic compositions have been suggested for use as herbicides and for retarding or otherwise regulating plant growth. Commonly accepted materials for the killing of weeds or control of other undesirable vegetation are the inorganic chlorates, the salts of dinitrophenols, and petroleum oil. The chlorates and dinitrophenolates are disadvantageous for use by reason of the highly flammable nature of deposits thereof on the dead and dried plant residues. Also, each is objectionable from the point of view of the operator, since residues on clothing are so flammable as to constitute a serious hazard. Furthermore, aqueous solutions of the chlorates are very corrosive to metal containers and applicators, whereby specialized equipment is required for their handling.

Similar disadvantages accrue to the conventional use of heavy petroleum oils. Here the oily non-volatile residues remaining on the vegetation constitute a fire hazard, and those portions of the treating material deposited in and on the soil may interfere with its subsequent utilization for long periods of time. Also, it has been found that oil has little effect upon the root systems of weeds and shrubs, whereby a temporary control may be followed by the growth of suckers or the resprouting of the unaffected roots.

Among the noxious plants which have proven very difficult to control by the usual methods is bindweed. The problem here is to accomplish the killing of the plant root system which may extend as far as 20 feet or more from the crown and base of the plant. While the accepted methods of treatment may cause a wilting and drying up of the leaves and stalk of bindweed, the roots not infrequently send up new sprouts at one or a number of different points so that a permanent control is not obtained.

It is among the objects of the present invention to provide an improved procedure for killing plants by the application of phytocidal agents thereto. Another object is to provide a plant treatment method using herbicidal compositions, deposits of which will be sufficiently impermanent as not to be objectionable from the point of view of flammability or residual toxicity. A further object is to provide a specific method for the control of bindweed. Other objects will become apparent from the following description.

According to the present invention it has been discovered that plants, and more particularly weeds and other obnoxious vegetable growth, can be killed by applying to the leaves and stalks of such plants and to the soil adjacent thereto a liquid dichloro-nitro-benzene mixture. The proper and timely application of such herbicidal mixture results in the killing of the treated plant and the control of borers, nematodes, and other organisms present in and on the treated plant or in the soil adjacent thereto and which may be contacted with either the liquid toxicant or vapors thereof. Deposits of the herbicide in or on the soil gradually volatilize and exert a blanketing effect, penetrating to the depth of several inches. This results in the destruction of the root system to a considerable distance from the crown of the treated plant and the killing over a period of at least one growing season of new shoots and suckers which may develop. The dichloro-nitro-benzenes are not readily flammable nor explosive and are sufficiently volatile as to be dispersed from the soil after a reasonable period and not to leave objectionable residues either in the soil or on dried cellulosic plant structures.

The expression "liquid dichloro-nitro-benzene mixture" as herein employed, refers to compositions consisting of two or more of the isomeric dichloro-nitro-benzenes in such proportion as to be liquid at ordinary temperatures. As constituents of such mixture, 2.4-dichloro-nitro-benzene, 2.5-dichloro-nitro-benzene, 2.6-dichloro-nitro-benzene, 3.4-dichloro-nitro-benzene, and 2.3-dichloro-nitro-benzene are satisfactory.

When operating in accordance with the invention, the liquid dichloro-nitro-benzene mixture may be employed without modification. In a further embodiment such mixture may be employed in aqueous emulsion or dissolved in a more volatile organic solvent. An alternate procedure comprises employing the dichloro-nitro-benzene mixture dispersed in or on a finely-divided solid such as wood flour, talc, diatomaceous earth, bentonite, pyrophyllite, clay, etc.

The amount of dichloro-nitro-benzene mixture employed varies with the form of the composition, the time in the growing season in which treatment is to be made, and the variety and age of plant to be treated. For the control of grass or weeds, any required amount of the material may be sprayed, poured, or dusted over the area on which it is desired to obtain the herbicidal effect. Also spot applications may be made to individual plants or plant clumps.

In carrying out the invention, the liquid dichloro-nitro-benzene may be applied to the plants at any time during the growing season. An optimum effect upon leaves, branches, stalks, and roots is obtained when the composition is applied in the spring or early summer. Following application of the herbicide to the plant surfaces and soil, there is a withering and shrinking of the foliage and stem portions of the plant. The root system is killed somewhat more slowly as the vapors of the dichloro-nitro-benzene penetrate into the soil. This vapor penetration is accompanied by a control of borers, nematodes, wire worms and other organisms contacted therewith.

The following examples are illustrative but are not to be construed as limiting the invention.

*Example 1*

Mature bindweed plants growing on a heavy clay soil were subjected to spot treatment with a liquid dichloro-nitro-benzene mixture containing 58 per cent by weight of 3.4-dichloro-nitro-benzene, 37 per cent of 2.3-dichloro-nitro-benzene, and 5 per cent of closely related dichloro-nitro-benzene products. In this operation, a 5 milliliter portion of the herbicide mixture was poured onto the crown of each plant. This application was made during the late spring. One month thereafter all of the aerial portions of the treated plants were dead, and excavation of the roots showed them to have been destroyed to a depth of about 5 inches below the soil.

*Example 2*

During mid-summer, one gallon of the dichloro-nitro-benzene mixture (described in Example 1) was sprayed over a mixed stand of adult plants of bindweed, quack grass, ragweed, rough pigweed, Canadian thistle, and downy brome grass. Within a few days of treatment, all of the aerial portions of the plants and their upper roots were dead. No new shoots appeared above ground during the balance of the growing season. Upon excavation of the root systems of representative bindweed plants, it was found that new shoots had started in many places only to be killed at approximately 3 to 4 inches below the soil surface by the blanket of dichloro-nitro-benzene fumes.

*Example 3*

90 parts by weight of the dichloro-nitro-benzene mixture of Example 1 and 10 parts of a partially neutralized sulfonated sperm oil were mixed together to produce a water-miscible herbicide concentrate. A spray mixture was prepared by stirring this product with water in the proportion of 1.5 pounds of concentrate per gallon of water. 30 gallons of this spray, containing about 45 pounds of the dichloro-nitro-benzene mixture, was applied with a power sprayer to 1000 sq. feet of a mixed stand of bindweed and field grasses. This application was made in mid-summer. The following day all treated foliage and blossoms were wilted down. It was found that the treatment accomplished substantially complete control of plant growth over the balance of the growing season.

*Example 4*

30 pounds of a liquid mixture of isomeric dichloro-mononitro-benzene is mixed with 100 pounds of fine sawdust and the resulting product scattered broadside over a mixed weed stand containing ragweed, pigweed, and plantain. This treatment is adapted quickly to kill those plants whose foliage is contacted with the composition, and to cause the eventual destruction of all plants, the roots of which are contacted with lethal concentrations of dichloro-mononitro-benzene vapor as the latter penetrates the soil.

We claim:

1. A method for killing plants which includes the step of applying to and about the growing plant an herbicide including as a principal toxic ingredient a liquid dichloro-nitro-benzene mixture.

2. A method for killing weeds which comprises spraying the ground adjacent to the weeds and the weed tops with a composition including a liquid dichloro-nitro-benzene mixture as a principal toxic ingredient.

3. A method for the control of bindweed which comprises applying to the growing plant and to the ground adjacent thereto a liquid dichloro-nitro-benzene mixture.

GEORGE E. LYNN.
BERNARD J. THIEGS.